(12) United States Patent
Klassen (10) Patent No.: US 8,543,914 B2
(45) Date of Patent: Sep. 24, 2013

(54) METHOD AND DEVICE FOR PROPORTIONAL SETTING OF FONT ATTRIBUTES

(75) Inventor: Gerhard Dietrich Klassen, Waterloo (CA)

(73) Assignee: BlackBerry Limited, Waterloo (CA)

( * ) Notice: Subject to any disclaimer, the term of this patent is extended or adjusted under 35 U.S.C. 154(b) by 289 days.

(21) Appl. No.: 12/470,551

(22) Filed: May 22, 2009

(65) Prior Publication Data

US 2010/0299395 A1    Nov. 25, 2010

(51) Int. Cl.
*G06F 17/00* (2006.01)
*G06F 17/20* (2006.01)

(52) U.S. Cl.
USPC .......................................... 715/269; 345/581

(58) Field of Classification Search
USPC ....................................................... 715/269
See application file for complete search history.

(56) References Cited

U.S. PATENT DOCUMENTS

| | | | | |
|---|---|---|---|---|
| 5,754,873 A * | 5/1998 | Nolan | ............................ | 715/235 |
| 5,893,915 A * | 4/1999 | Cordell et al. | ................ | 715/262 |
| 6,081,831 A * | 6/2000 | Miura | ............................ | 709/206 |
| 6,456,305 B1 * | 9/2002 | Qureshi et al. | ................ | 715/800 |
| 2004/0119714 A1 * | 6/2004 | Everett et al. | ................ | 345/471 |
| 2004/0148571 A1 * | 7/2004 | Lue | ............................... | 715/514 |
| 2004/0253568 A1 | 12/2004 | Shaver-Troup | | |
| 2005/0162446 A1 * | 7/2005 | Worrell | .......................... | 345/660 |
| 2005/0193336 A1 * | 9/2005 | Fux et al. | ........................ | 715/542 |
| 2006/0101162 A1 * | 5/2006 | Ivarsy et al. | ....................... | 710/8 |
| 2007/0006076 A1 * | 1/2007 | Cheng | ............................ | 715/542 |
| 2007/0083810 A1 | 4/2007 | Scott et al. | | |
| 2007/0094591 A1 | 4/2007 | Etgen et al. | | |
| 2008/0139191 A1 * | 6/2008 | Melnyk et al. | ................. | 455/419 |
| 2008/0150947 A1 * | 6/2008 | Suzuki | ............................ | 345/472 |
| 2008/0225306 A1 * | 9/2008 | Shepherd et al. | .............. | 358/1.2 |
| 2009/0225086 A1 * | 9/2009 | Tomida | ............................ | 345/472 |
| 2012/0290919 A1 * | 11/2012 | Melnyk et al. | ................ | 715/234 |

OTHER PUBLICATIONS

Gupta et al., "Mobile Web: Web Manipulation for Small Displays using Multi-level Hierarchy Page Segmentation", ACM, 2007, pp. 599-606.*
Hua et al,"A Collaborative Environment for Enhanced Information Access on Smal-Form-Factor Devices", ACM, 2005, pp. 325-326.*

(Continued)

*Primary Examiner* — James Debrow
(74) *Attorney, Agent, or Firm* — Ridout & Maybee LLP (57) ABSTRACT

A method and handheld electronic device for displaying text in accordance with a user-specified font attributes are provided. Where the text comprises formatted sections of varying font sizes, the font size settings are set according to a default font size specified for the device to provide a readable display of text. Text with a font size above a maximum threshold is set to a large font size appropriate for the device display. Text with a font size below a minimum threshold is set to a small font size appropriate for the device display. Text with a font size between the minimum and maximum thresholds is set to the default font size for the device. The font face of the text may be set to a user-specified font face, however, fixed-width fonts are unchanged in order to preserve spacing and formatting associated with text in fixed-width format.

16 Claims, 4 Drawing Sheets

(56) References Cited

OTHER PUBLICATIONS

Printout from The Hobo SEO Company web-site located at the URL http://www.hobo-web.co.uk/tips/55.htm (Accessed Nov. 24, 2008, 5 pages).

Printout from the "useit.com" web-site located at the URL http://www.useit.com/alertbox/20020819.html (Accessed Nov. 25, 2008, 4 pages).

Printout from "flexknowlogy" web-site located at the URL http://flexknowlogy.learningfield.org/2008/06/26/setting-font-size-proportional-to-window-size/ (Accessed Nov. 25, 2008, 3 pages).

Printout from the World Wide Web Consortium web-site located at the URL http://www.w3.org/TR/CCS2/fonts.html (Accessed Nov. 25, 2008, 44 pages).

* cited by examiner

METHOD AND DEVICE FOR PROPORTIONAL SETTING OF FONT ATTRIBUTES

TECHNICAL FIELD

The present disclosure relates generally to the display of text on a computing device and in particular, a method and device for proportional setting of the font size and font face of text according to a user specified attributes.

BACKGROUND

In displaying and rendering HTML (HyperText Markup Language) formatted content such as Web pages or email on an electronic device, problems can be encountered in properly rendering and displaying the text and images. The formats specified in the HTML content must be evaluated and mapped to formats supported by the device. HTML content such as Web pages typically are designed and formatted to accommodate or be adapted to different user devices and to be easily and clearly displayed.

For other HTML content, such as an HTML email message, the formats and parameters such as the font face or type and font size typically are specified by the author or sender of the email message or by the email authoring tool, without regard to the formats supported or preferred by the email recipient. HTML email messages also may not be structured to be easily adapted to the recipient's device. To make the text more readable, an author may format portions of the text such as headings with a larger font size relative to the main portion of the message. Other portions, such as footnotes, may be formatted with a smaller font size. However, the recipient of the text or email message may not like the specified font face and font size specified by the author. The font face may be hard to read and the font size may be too large or too small for display on the recipient device. Where a font is specified by an author according to point size, the font displayed by the recipient may not appear as intended if the DPI (dots per inch) setting on the device is not configured appropriately.

The font face and font size of the text may be overridden by the recipient device to display the text according to the user's preferred font formats, however, in doing so the formatting and font size differences and alignment in the text for different portions such as headings or footnote sections are not preserved. Other devices may attempt to map HTML text to a preferred user font face while preserving the relative sizing specified by the author which may result in unusually large or extremely small text. Changing of the font face attribute also may cause misalignment and improper spacing of text on the display. Problems in mapping the font may be exacerbated when the information is displayed on an electronic device having a relatively small display screen. Relatively large text may dominate the display and make scrolling through and reading the email message laborious and unmanageable. Relatively small text, when displayed on a smaller screen, may be illegible and all but disappear from the display.

BRIEF DESCRIPTION OF THE DRAWINGS

Like reference numerals are used in the drawings to denote like elements and features.

DETAILED DESCRIPTION OF EXAMPLE EMBODIMENTS

The present disclosure provides a method and device for setting the font face and font size of a formatted text display according to user specified parameters while maintaining some of the proportional formatting for portions of the text. The method and device of the present disclosure set the font size settings to map to appropriate font sizes to ensure clear display of the text on a device with a smaller display screen. Larger font sizes in excess of a maximum font size threshold are mapped to a larger yet acceptable font size for the device. Smaller font sizes below a minimum font size threshold are mapped to a smaller yet readable font size.

According to one example embodiment there is provided a method of displaying at least one formatted text element on an electronic device. The electronic device has a default font face, a default font size, a maximum font size threshold and a minimum font size threshold stored thereon. The method comprises reading a font size of the at least one formatted text element; setting the font size to the default font size if the font size is between the minimum font size threshold and the maximum font size threshold; setting the font size to a first predetermined font size if the font size is greater than the maximum font size threshold; setting the font size to a second predetermined font size if the font size is less than the minimum font size threshold; and displaying the at least one formatted text element at the set font size.

According to another example embodiment is an electronic device, for displaying at least one formatted text element. The electronic device comprises a controller for controlling the operation of the electronic device and a memory connected to the controller, the memory storing a default font face, a default font size, a maximum font size threshold and a minimum font size threshold; and a display, connected to the controller, for displaying the at least one formatted text element. The controller is configured to: read a font size of the at least one formatted text element; set the font size to the default font size if the font size is between the minimum font size threshold and the maximum font size threshold, set the font size to a first predetermined font size if the font size is greater than the maximum font size threshold, and set the font size to a second predetermined font size if the font size is less than the minimum font size threshold.

According to another example embodiment of the present disclosure, there is provided a computer-readable storage medium in an electronic device having a display for displaying at least one formatted text element. The medium has stored thereon a default font face, a default font size, a maximum font size threshold, a minimum font size threshold and computer-readable and computer-executable instructions, which, when executed by a processor, cause the electronic device to perform steps comprising: reading a font face of the at least one formatted text element; determining that the font face is a changeable font type and, if so, setting the font face to the default font face; reading a font size of the at least one formatted text element; setting the font size to the default font size if the font size is between the minimum font size threshold and the maximum font size threshold; setting the font size to a first predetermined font size if the font size is greater than the maximum font size threshold; setting the font size to a second predetermined font size if the font size is less than the minimum font size threshold; and displaying the at least one formatted text element at the set font size.

Example embodiments described below may make reference to Hypertext Markup Language (HTML) text or HTML format email. It will be appreciated that the present application is not limited to HTML, and may in some embodiments include other markup languages or container languages, including, for example, extensible Markup Language (XML) and Standard Generalized Markup Language (SGML), and evolutions, variations, or modifications of those. In general, the present application may be applicable in the context of any schema-based or non-schema based language capable of specifying text font attributes, such as font size.

It will also be understood that, although the present application describes embodiments that apply to email messages, application is not limited to email message. Embodiments may include other messages employing a structured language for specifying font attributes; for example, certain Multimedia Messaging Service (MMS) messages, Instant Messages (IMs), or other such messages. Moreover, the present application is not necessarily limited to messages, as such, and may be applicable to other text documents, including webpages, files, attachments, and other content having text in a format that specifies font attributes.

Figure 1:
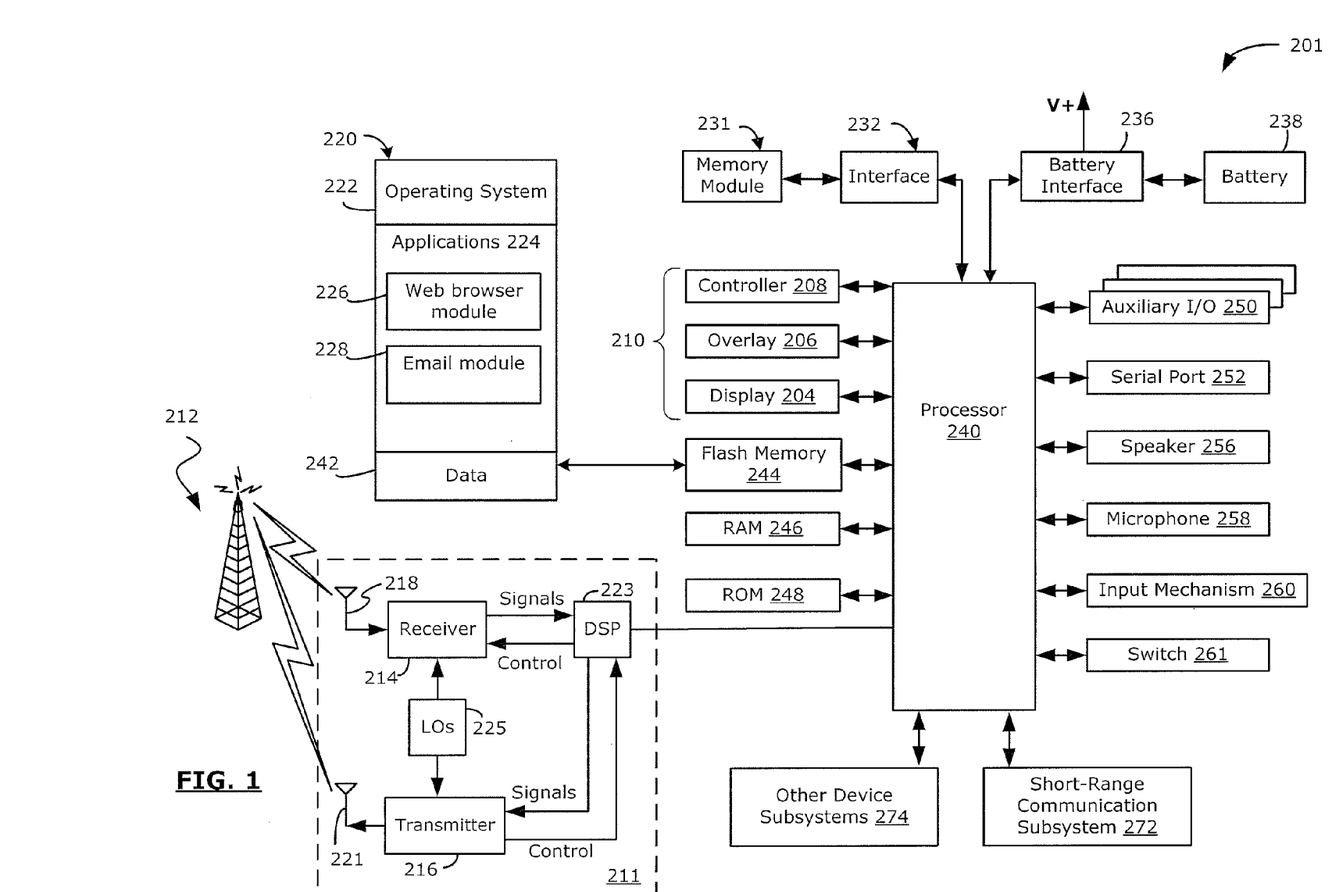
FIG. 1 is a block diagram illustrating a mobile communication device in accordance with one embodiment of the present disclosure.

FIG. 1 illustrates a mobile communication device 201 in which example embodiments described in the present disclosure can be applied. The mobile communication device 201 is a two-way communication device having at least data and possibly also voice communication capabilities, and the capability to communicate with other computer systems, for example, via the Internet. Depending on the functionality provided by the mobile communication device 201, in various embodiments the device may be a data communication device, a multiple-mode communication device configured for both data and voice communication, a smartphone, a mobile telephone or a PDA (personal digital assistant) enabled for wireless communication, or a computer system with a wireless modem.

The mobile communication device 201 includes a controller comprising at least one processor 240 such as a microprocessor which controls the overall operation of the mobile communication device 201, and a wireless communication subsystem 211 for exchanging radio frequency signals with the wireless network 212. The processor 240 interacts with the communication subsystem 211 which performs communication functions. The processor 240 interacts with additional device subsystems including a display (screen) 204, such as a liquid crystal display (LCD) screen, with a touch-sensitive input surface or overlay 206 connected to an electronic controller 208 that together make up a touchscreen display 210. The touch-sensitive overlay 206 and the electronic controller 208 provide a touch-sensitive input device and the processor 240 interacts with the touch-sensitive overlay 206 via the electronic controller 208.

The processor 240 interacts with additional device subsystems including flash memory 244, random access memory (RAM) 246, read only memory (ROM) 248, auxiliary input/output (I/O) subsystems 250, data port 252 such as serial data port, such as a Universal Serial Bus (USB) data port, speaker 256, microphone 258, control keys 260, switch 261, short-range communication subsystem 272, and other device subsystems generally designated as 274. Some of the subsystems shown in FIG. 2 perform communication-related functions, whereas other subsystems may provide "resident" or on-device functions.

The communication subsystem 211 includes a receiver 214, a transmitter 216, and associated components, such as one or more antenna elements 218 and 221, local oscillators (LOs) 225, and a processing module such as a digital signal processor (DSP) 223. The antenna elements 218 and 221 may be embedded or internal to the mobile communication device 201 and a single antenna may be shared by both receiver and transmitter, as is known in the art. As will be apparent to those skilled in the field of communication, the particular design of the wireless communication subsystem 211 depends on the wireless network 212 in which mobile communication device 201 is intended to operate.

The mobile communication device 201 may communicate with any one of a plurality of fixed transceiver base stations of the wireless network 212 within its geographic coverage area. The mobile communication device 201 may send and receive communication signals over the wireless network 212 after the required network registration or activation procedures have been completed. Signals received by the antenna 218 through the wireless network 212 are input to the receiver 214, which may perform such common receiver functions as signal amplification, frequency down conversion, filtering, channel selection, etc., as well as analog-to-digital (A/D) conversion. A/D conversion of a received signal allows more complex communication functions such as demodulation and decoding to be performed in the DSP 223. In a similar manner, signals to be transmitted are processed, including modulation and encoding, for example, by the DSP 223. These DSP-processed signals are input to the transmitter 216 for digital-to-analog (D/A) conversion, frequency up conversion, filtering, amplification, and transmission to the wireless network 212 via the antenna 221. The DSP 223 not only processes communication signals, but may also provide for receiver and transmitter control. For example, the gains applied to communication signals in the receiver 214 and the transmitter 216 may be adaptively controlled through automatic gain control algorithms implemented in the DSP 223.

The processor 240 operates under stored program control and executes software modules 220 stored in memory such as persistent memory, for example, in the flash memory 244. The software modules 220 comprise operating system software 222 and software applications 224. The software applications 224 may include a range of applications, including, a web browser module 226 and an email message application 228. The software applications may include an address book application, a messaging application, a calendar application, and/or a notepad application, a push content viewing application, a voice communication (i.e. telephony) application, a map application, and a media player application (not shown). The software applications 224 may among other things, each be implemented through stand-alone software applications, or combined together in one or more of the operating system 222 or one or more of the other software applications 224. In some embodiments, the functions performed by each of the above identified modules may be realized as a plurality of independent elements, rather than a single integrated element, and any one or more of these elements may be implemented as parts of other software applications.

Those skilled in the art will appreciate that the software modules 220 or parts thereof may be temporarily loaded into volatile memory such as the RAM 246. The RAM 246 is used for storing runtime data variables and other types of data or information, as will be apparent to those skilled in the art. Although specific functions are described for various types of memory, this is merely an example, and those skilled in the art will appreciate that a different assignment of functions to types of memory could also be used.

In some embodiments, the auxiliary input/output (I/O) subsystems 250 may comprise an external communication link or interface, for example, an Ethernet connection. The mobile communication device 201 may comprise other wireless communication interfaces for communicating with other types of wireless networks, for example, a wireless network such as an orthogonal frequency division multiplexed (OFDM) network or a GPS transceiver for communicating with a GPS satellite network (not shown). The auxiliary I/O subsystems 250 may comprise a vibrator for providing vibratory notifications in response to various events on the mobile communication device 201 such as receipt of an electronic communication or incoming phone call, or for other purposes such as haptic feedback (touch feedback).

In some embodiments, the mobile communication device 201 also includes a removable memory card 231 (typically comprising flash memory) and a memory card interface 232. Network access typically associated with a subscriber or user of the mobile communication device 201 via the memory card 231, which may be a Subscriber Identity Module (SIM) card for use in a GSM network or other type of memory card for use in the relevant wireless network type. The memory card 231 is inserted in or connected to the memory card interface 232 of the mobile communication device 201 in order to operate in conjunction with the wireless network 212.

The mobile communication device 201 stores data 242 in an erasable persistent memory, which in one example embodiment is the flash memory 244. In various embodiments, the data 242 includes service data comprising information required by the mobile communication device 201 to establish and maintain communication with the wireless network 212. The data 242 may also include user application data such as email messages, address book and contact information, calendar and schedule information, notepad documents, image files, and other commonly stored user information stored on the mobile communication device 201 by its user, and other data. The data 242 stored in the persistent memory (e.g. flash memory 244) of the mobile communication device 201 may be organized, at least partially, into a number of databases each containing data items of the same data type or associated with the same application. For example, email messages, contact records, and task items may be stored in individual databases within the device memory.

The serial data port 252 may be used for synchronization with a user's host computer system (not shown). The serial data port 252 enables a user to set preferences through an external device or software application and extends the capabilities of the mobile communication device 201 by providing for information or software downloads to the mobile communication device 201 other than through the wireless network 212. The alternate download path may, for example, be used to load an encryption key onto the mobile communication device 201 through a direct, reliable and trusted connection to thereby provide secure device communication.

In some embodiments, the mobile communication device 201 is provided with a service routing application programming interface (API) which provides an application with the ability to route traffic through a serial data (i.e., USB) or Bluetooth® connection to the host computer system using standard connectivity protocols. When a user connects their mobile communication device 201 to the host computer system via a USB cable or Bluetooth® connection, traffic that was destined for the wireless network 212 is automatically routed to the mobile communication device 201 using the USB cable or Bluetooth® connection. Similarly, any traffic destined for the wireless network 212 is automatically sent over the USB cable Bluetooth® connection to the host computer system for processing.

The mobile communication device 201 also includes a battery 238 as a power source, which is typically one or more rechargeable batteries that may be charged, for example, through charging circuitry coupled to a battery interface such as the serial data port 252. The battery 238 provides electrical power to at least some of the electrical circuitry in the mobile communication device 201, and the battery interface 236 provides a mechanical and electrical connection for the battery 238. The battery interface 236 is coupled to a regulator (not shown) which provides power V+ to the circuitry of the mobile communication device 201.

The short-range communication subsystem 272 is an additional optional component which provides for communication between the mobile communication device 201 and different systems or devices, which need not necessarily be similar devices. For example, the subsystem 272 may include an infrared device and associated circuits and components, or a wireless bus protocol compliant communication mechanism such as a Bluetooth® communication module to provide for communication with similarly-enabled systems and devices (Bluetooth® is a registered trademark of Bluetooth SIG, Inc.).

A predetermined set of applications that control basic device operations, including data and possibly voice communication applications will normally be installed on the mobile communication device 201 during or after manufacture. Additional applications and/or upgrades to the operating system 222 or software applications 224 may also be loaded onto the mobile communication device 201 through the wireless network 212, the auxiliary I/O subsystem 250, the serial port 252, the short-range communication subsystem 272, or other suitable subsystems 274 or other wireless communication interfaces. The downloaded programs or code modules may be permanently installed, for example, written into the program memory (i.e. the flash memory 244), or written into and executed from the RAM 246 for execution by the processor 240 at runtime. Such flexibility in application installation increases the functionality of the mobile communication device 201 and may provide enhanced on-device functions, communication-related functions, or both. For example, secure communication applications may enable electronic commerce functions and other such financial transactions to be performed using the mobile communication device 201.

The mobile communication device 201 may include a personal information manager (PIM) application having the ability to organize and manage data items relating to a user such as, but not limited to, instant messaging, email, calendar events, voice mails, appointments, and task items. The PIM application has the ability to send and receive data items via the wireless network 212. In some example embodiments, PIM data items are seamlessly combined, synchronized, and updated via the wireless network 212, with the user's corresponding data items stored and/or associated with the user's host computer system, thereby creating a mirrored host computer with respect to these data items.

The mobile communication device 201 may provide two principal modes of communication: a data communication mode and an optional voice communication mode. In the voice communication mode, the mobile communication device 201 provides telephony functions and operates as a typical cellular phone. The overall operation is similar, except that the received signals would be output to the speaker 256 and signals for transmission would be generated by a transducer such as the microphone 258. The telephony functions are provided by a combination of software/firmware (i.e., the voice communication module) and hardware (i.e., the microphone 258, the speaker 256 and input devices). Alternative voice or audio I/O subsystems, such as a voice message recording subsystem, may also be implemented on the mobile communication device 201. Although voice or audio signal output is typically accomplished primarily through the speaker 256, the display device 204 may also be used to provide an indication of the identity of a calling party, duration of a voice call, or other voice call related information.

In the data communication mode, a received data signal such as a text message, an email message, or web page download will be processed by the communication subsystem 211 and input to the processor 240 for further processing. For example, a downloaded web page may be further processed by a web browser module 226 to parse the HTML structure and format of the web page and output the web page to the display 210. An email message may be processed by an email message module 228 and output to the display 210. A user of the mobile communication device 201 also may compose data items, such as email messages, for example, using the touch-sensitive overlay 206 in conjunction with the display device 204 and possibly the control buttons 260 and/or the auxiliary I/O subsystems 250. These composed items may be transmitted through the communication subsystem 211 over the wireless network 212.

Email messages may contain formatted text, for example using HTML or enriched text, wherein portions or sections of the text are formatted with varying font faces or types, font sizes or font colours, among other features, allowing the email to display text as it may appear in an Internet web browser. HTML provides a method of specifying structure and attributes of text within a document and to supplement text with embedded images and other objects. As noted previously, although the following description mentions HTML, the present application may have broader application to other markup languages or formatted languages in which font attributes may be specified with the text content. The present application may also have broader application to non-email messages or other documents or content containing formatted text.

Attributes of the HTML content such as web pages or an email message may be specified in a number of ways. The HTML <font> tag, although deprecated in later versions of HTML, may be used to specify attributes of text, such as "size", "face" and "color" parameters. The "font size" may range in values from 1 to 7, with a default of 3. The "font face" specifies the name of the font, such as Verdana, Times, Monospace etc. Style sheets, such as the Cascading Style Sheets (CSS) are more commonly used to specify formatting and presentation of text in an HTML document. Styles may be embedded in the document itself, defined in an external CSS style sheet attached to the document, or provided by accessing a URL address link specified in the document. In CSS, the name of the font (Verdana, Times, Monospace etc.) is provided by the "font-family" property. The font-size property may be specified as an absolute value, such as one of "xx-small, x-small, small, medium, large, x-large, xx-large", with a default of "medium". Font sizes also may be adjusted to provide a section of text with a font size relatively larger or smaller than the set or parent font size. Varied font sizes may be set using a percentage value or by scaling the font size in relative terms to be larger or smaller than the parent value.

When an email message in HTML format is received by the device 201, the text is processed by software applications 224 in the device 201 to render the HTML information and display the formatted text. In one embodiment, the email message is processed by the email module 228 to display fields such as a subject line and sender. The HTML content is passed to the web browser module 226 to parse and render the HTML information and content of the message. As described below, an HTML email flag is set or a state variable is used in order to differentiate HTML email content from HTML web page content. Alternatively, the email module 228 or an additional software application 224 could parse and display the HTML content of the email according to the present disclosure.

The web browser module 226 parses and interprets the various HTML attribute settings or properties, such as the font face and font size, to render the HTML content on the display 210 of the device 201. If the HTML text specifies a font face that is not supported on the device 201, a default font face or appropriate substitute is used. The web browser module 226 renders the font size information such as an attribute of "3" or "medium" to a user selected default font size. The font size information is used to calculate a point size or pixel setting for display of the text on the device 201.

Larger and smaller font sizes which may be specified for different portions or sections of the text are also rendered by the web browser module 226. For example, where a default or parent font size corresponds to an 8 pt font on the device 201, a header section of text with a relative or adjusted font setting of "150%" is displayed as a 12 pt font, and a section of text with a relative or adjusted font setting of "75%" is displayed as a 6 pt font on the device 201.

Since the HTML content of an email message is often poorly encoded by the author or authoring tool, and thus not as easily parsed or displayed in comparison to web page content, a font reset feature may be set to provide a readable display of different font sizes and font faces for the device 201. Alternatively, the font reset feature may be configurable and enabled or disabled by a user. Font sizes specified in the HTML email are compared to maximum and minimum font size thresholds to ensure the font is not too large or too small for display on the device 201. Font sizes within these thresholds may be overridden and set to a default or preferred font size for the device. In order to maintain some formatting of the HTML text and readability which results from the use of different font sizes for headers or footnote information, font sizes above the maximum threshold are adjusted to a font size which is larger than the default font size, but still acceptable for displaying on the device 201. Similarly, font sizes below the minimum threshold are adjusted to a font size which is smaller than the default font size, but still acceptable for displaying on the device 201. Readability and formatting also is maintained by setting the font face attribute according to a user specified default font face. Specific font faces, such as fixed-width fonts, may be preserved and left unchanged in order to maintain spacing and alignment of text.

In one embodiment a default 8 pt font size is specified. Font sizes which are above a maximum threshold of a 12 pt font size may be adjusted to display at a font size 25% larger than the default font size, or 10 pt. Font sizes which are less than a minimum threshold of an 8 pt font size may be adjusted to be displayed at a font size 25% smaller than the default font size, or 6 pt. The font size thresholds and large and small font sizes may be configurable by the user when the font size feature is enabled or defined and set in the device 201. Some formatting of the email text may be lost where an author has used multiple font sizes for multiple headings. In the above example, headings with a font size of 14 pt or 16 pt will both appear in a 10 pt font. However, it will be appreciated that more than two thresholds and three different sizes of font may be implemented. Thus, some variation in the font sizes specified for sections of text in an email is preserved, while the font sizes are adjusted to display the text according to font sizes suitable for the device 201.

Figure 2:
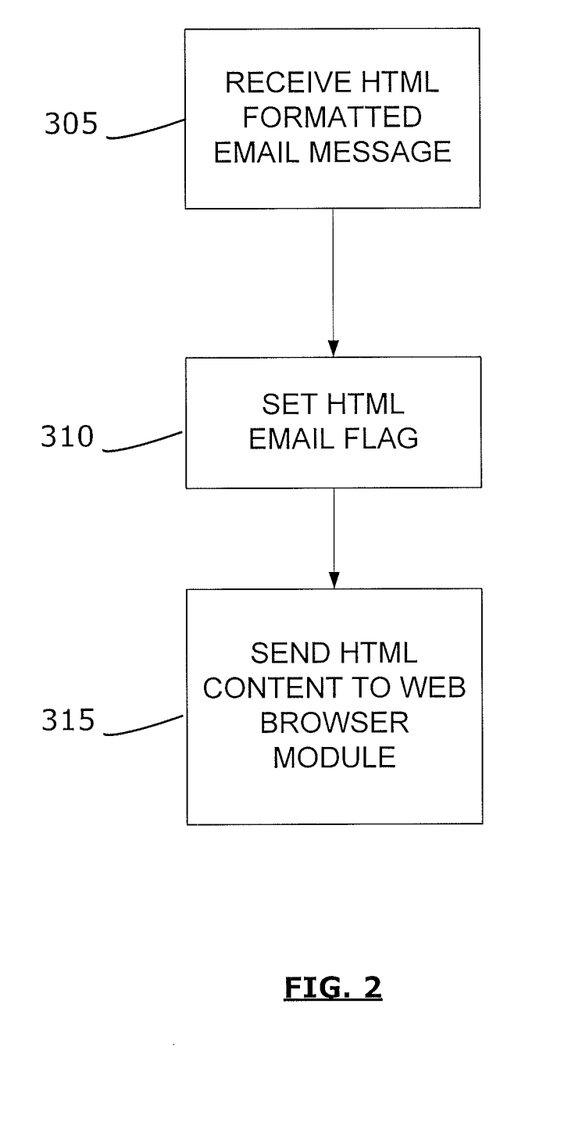
FIG. 2 illustrates a flow chart of a first part of a method of setting font size.
Figure 3:
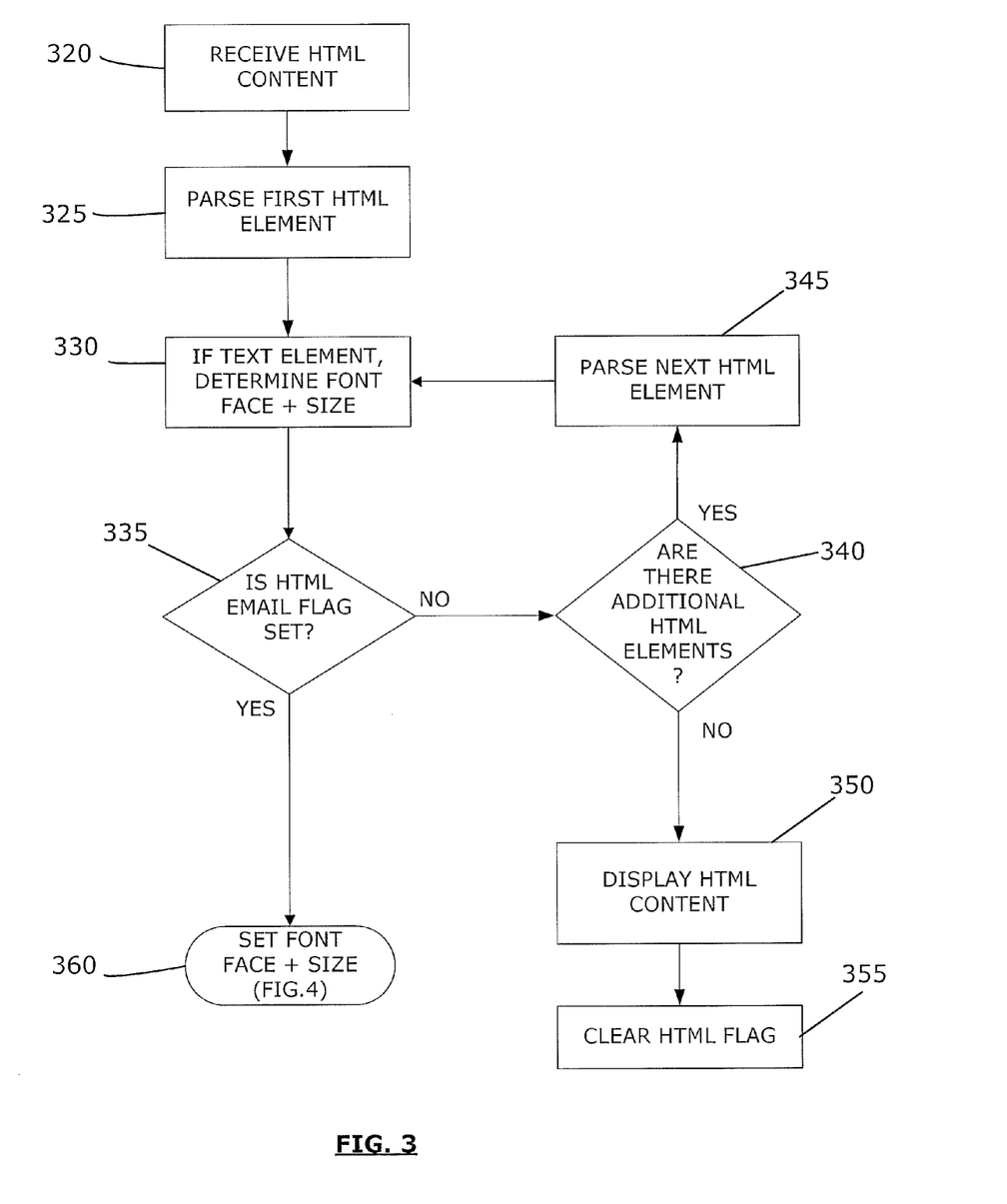
FIG. 3 illustrates a flow chart of a second part of a method of setting font size.
Figure 4:
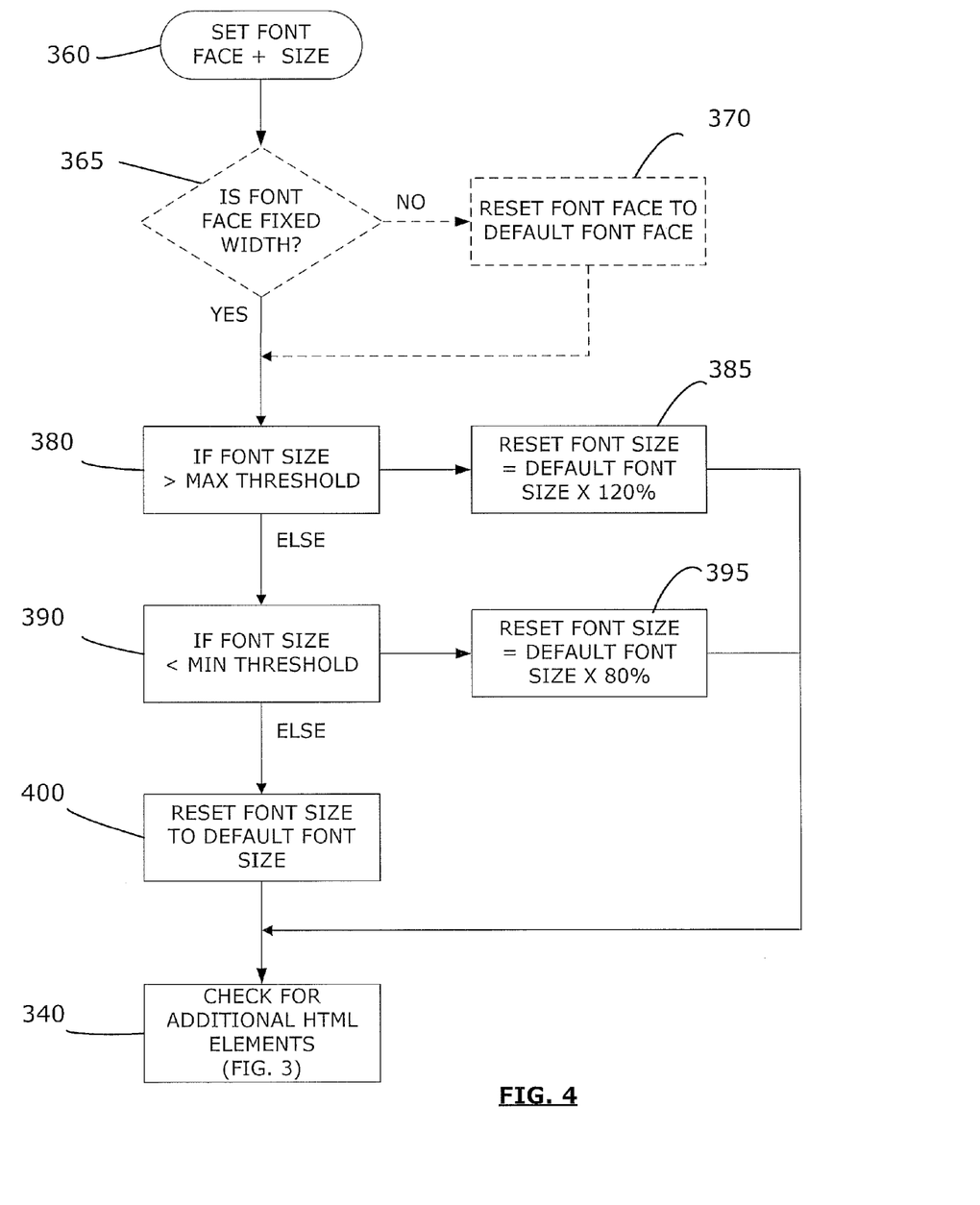
FIG. 4 illustrates a flow chart of third part of a method of setting font size.

A method of setting the font size for HTML text in the device of 201 is illustrated in FIGS. 2 to 4. An HTML email message is received at step 305 by the device 201. If the HTML font size feature is enabled, the HTML email flag is set at step 310 to indicate the HTML content is part of an email message. The HTML content is passed to the web browser module 226 at step 315.

As illustrated in FIG. 3, the web browser module 226 receives the HTML content of the email at step 320. The web browser module 226 parses the HTML elements of the email according to known methods, starting with the first HTML element at step 325. It will be understood that FIG. 3 provides a high level view of the method of the present disclosure; detailed and known steps for parsing and rendering HTML content will be understood by persons of ordinary skill in the art.

If the HTML element includes text to be displayed on the device 201, the font face and font size specified for the text are determined at step 330 according to the known methods described above for interpreting and mapping HTML attributes. The web browser module 226 examines the HTML email flag at step 335. If the flag is not set, the font attributes are not processed further and the web browser module 226 determines if there are any remaining HTML elements to be processed (step 340). If so, the next HTML element is parsed at step 345. If there are no remaining HTML elements to be processed, the HTML content is displayed at step 350.

If the HTML email flag is set, the font face and size may be reset 360 as illustrated in FIG. 4. In one embodiment, the font face is evaluated at step 365 to determine if the font face may be changed. For example, fixed-width fonts such as "Monospace" or "Courier" typically are used to ensure text remains aligned within a message such as when providing information under headings or in columns. If the font face is a fixed-width type, changing of the font face is not performed in order to preserve the alignment of sections of text typically associated with fixed-width fonts. If the font face is not a fixed-width type, the font face is reset to match a user's preferred default font face (step 370).

The font size is examined and set at steps 380 to 400. If the font size is greater than the maximum font size threshold (step 380), the font size is set to the defined large font size, such as a font size 20% larger than the default font size (step 385). If the font size is smaller than the minimum threshold (step 390), the font size is set to the defined small font size, such as a font size 20% smaller than the default font size (step 395). Otherwise, font sizes falling with the range defined by the maximum and minimum thresholds are set to the default font size (step 400). The web browser module 226 continues to parse the HTML content and determines if there are any remaining HTML elements to be processed (step 340 in FIG. 3). If there are no additional HTML elements, the HTML content of the email is displayed (step 350) on the device 201. The HTML email flag is cleared by the web browser module 226 or by the email module 228.

It is understood that the HTML text may be rendered by the web browser module 226 to provide font size information in units of pixels, point size or other applicable measurements, and the method of the present disclosure may be applied with appropriate maximum and minimum thresholds. The font size may be adjusted or recalculated accordingly to provide the appropriate font size information and units for rendering the display of the text on the device 201.

With the setting of the HTML email flag, additional steps are taken by the web browser module 226 to parse and display HTML content to overcome the problems associated with displaying HTML emails on a relatively small display screen. It will be apparent that a flag or state variable are not necessary if a software application 224 is dedicated to processing HTML email content.

While the present disclosure is primarily described in terms of methods, a person of ordinary skill in the art will understand that the present disclosure is also directed to various apparatus such as a handheld electronic device including components for performing at least some of the aspects and features of the described methods, be it by way of hardware components, software or any combination of the two, or in any other manner. Moreover, an article of manufacture for use with the apparatus, such as a pre-recorded storage device or other similar computer readable medium including program instructions recorded thereon, or a computer data signal carrying computer readable program instructions may direct an apparatus to facilitate the practice of the described methods. It is understood that such apparatus, articles of manufacture, and computer data signals also come within the scope of the present disclosure.

The specific embodiments described above indicate that the setting or resetting of font size is performed by a handheld electronic device after receiving a formatted text message in order to display the message on the device. It will be appreciated that some of the steps in the described method may be performed prior to transmission of the formatted text message to the device. For example, in some embodiments, the device may be associated with a proxy server or other platform within the network and through which the message or other document is routed before reaching the handheld electronic device. In such embodiments, the proxy server or other platform may perform the setting of font size and modify the message accordingly before transmitting the modified message to the device. It will be appreciated that this may differ from some of the above described embodiments in that the markup tags within the message itself are modified, whereas in some of the described embodiments above the setting of font size is performed in the course of rendering the message and does not necessarily involve modifying the markup tags within the message in memory on the device.

In an embodiment in which some or all of the font setting operations are performed by a proxy server or other platform within the network, the proxy server or other platform may have stored thereon the thresholds and predetermined font sizes for performing the font setting operations. The thresholds and predetermined font sizes stored at the proxy server or other platform may be selected or configured by the user and/or an administrator. In another embodiment, the proxy server or other platform may store multiple thresholds and predetermined font sizes and associate them with certain device types based on known device capabilities. It may then select a set of threshold and predetermined font sizes based on the type of device to which a particular message is addressed. Other methods of determining the appropriate thresholds and font sizes may also be used.

The term "computer readable medium" as used herein means any medium which can store instructions for use by or execution by a computer or other computing device including, but not limited to, a portable computer diskette, a hard disk drive (HDD), a random access memory (RAM), a read-only memory (ROM), an erasable programmable-read-only memory (EPROM) or flash memory, an optical disc such as a Compact Disc (CD), Digital Versatile Disc (DVD) or Blu-ray™ Disc, and a solid state storage device (e.g., NAND flash or synchronous dynamic RAM (SDRAM)).

The various embodiments presented above are merely examples and are in no way meant to limit the scope of this disclosure. Variations of the innovations described herein will be apparent to persons of ordinary skill in the art, such variations being within the intended scope of the present application. In particular, features from one or more of the above-described embodiments may be selected to create alternative embodiments comprised of a sub-combination of features which may not be explicitly described above. In addition, features from one or more of the above-described embodiments may be selected and combined to create alternative embodiments comprised of a combination of features which may not be explicitly described above. Features suitable for such combinations and sub-combinations would be readily apparent to persons skilled in the art upon review of the present application as a whole. The subject matter described herein and in the recited claims intends to cover and embrace all suitable changes in technology.

The invention claimed is:

1. A method of displaying one formatted text element out of a plurality of elements in a document, on an electronic device, the electronic device having a default font face, a default font size, a maximum font size threshold and a minimum font size threshold stored thereon, the method comprising:
reading an original font face and an original font size of the formatted text element;
after the reading step, determining whether the original font face is a changeable font face and, if so, setting the font face to the default font face;
comparing the original font size to the minimum font size threshold and maximum font size threshold;
after comparing the original font size to the minimum font size threshold and maximum font size threshold,
setting the font size to the default font size if the original font size is between the minimum font size threshold and the maximum font size threshold;
setting the font size to a first predetermined font size larger than the default font size if the original font size is greater than the maximum font size threshold;
setting the font size to a second predetermined font size smaller than the default font size if the original font size is less than the minimum font size threshold; and
displaying the formatted text element at the set font size.

2. The method of claim 1 wherein the first predetermined font size is at least 20% larger than the default font size.

3. The method of claim 1 wherein the second predetermined font size is at least 20% smaller than the default font size.

4. The method of claim 1 wherein the formatted text element comprises a HyperText Markup Language (HTML) text element.

5. The method of claim 1 further comprising receiving a HyperText Markup Language (HTML) email message, wherein the HTML email message contains the formatted text element.

6. The method of claim 1 further comprising displaying a HyperText Markup Language (HTML) email message wherein the HTML email message contains multiple formatted text elements.

7. The method of claim 1 wherein the changeable font face comprises non-fixed width font faces.

8. An electronic device for displaying one formatted text element out of a plurality of elements in a document, the electronic device comprising:
a controller for controlling the operation of the electronic device;
a memory connected to the controller, the memory storing a default font face, a default font size, a maximum font size threshold and a minimum font size threshold of the electronic device; and
a display, connected to the controller, for displaying the at least one formatted text element;
the controller being configured to: read an original font face and an original font size of the formatted text element; after the reading step, determine whether the original font face is a changeable font face and, if so, setting the font face to the default font face; compare the original font size to the minimum font size threshold and maximum font size threshold; and after performing the comparison, set the font size to the default font size if the original font size is between the minimum font size threshold and the maximum font size threshold, set the font size to a first predetermined font size larger than the default font size if the original font size is greater than the maximum font size threshold, and set the font size to a second predetermined font size smaller than the default font size if the original font size is less than the minimum font size threshold.

9. The electronic device of claim 8 wherein the electronic device is a mobile electronic device configured for wireless communications.

10. The electronic device of claim 8 wherein the first predetermined font size is at least 20% larger than the default font size.

11. The electronic device of claim 8 wherein the second predetermined font size is at least 20% smaller than the default font size.

12. The electronic device of claim 8 wherein the changeable font face comprises a non-fixed-width font face.

13. The electronic device of claim 8 wherein the default font face, default font size, maximum font size threshold and minimum font size threshold are configurable by a user.

14. The electronic device of claim 8 wherein the formatted text element comprises a HyperText Markup Language (HTML) text element.

15. The electronic device of claim 8 further comprising a receiver, for receiving a HyperText Markup Language (HTML) email message, wherein the HTML email message contains the formatted text element.

16. A computer-readable storage medium in an electronic device having a display for displaying one formatted text element out of a plurality of elements in a document, the medium having stored thereon a default font face, a default font size, a maximum font size threshold, a minimum font size threshold and computer-readable and computer-executable instructions, which, when executed by a processor, cause the electronic device to perform steps comprising:
reading an original font face and an original font size of the at least one formatted text element;
after the reading step, determining if the original font face is a changeable font face and, if so, setting the font face to the default font face;
comparing the original font size to the minimum font size threshold and maximum font size threshold;
after comparing the original font size to the minimum font size threshold and maximum font size threshold,
setting the font size to the default font size if the original font size is between the minimum font size threshold and the maximum font size threshold;
setting the font size to a first predetermined font size larger than the default font size if the original font size is greater than the maximum font size threshold;

setting the font size to a second predetermined font size smaller than the default font size if the original font size is less than the minimum font size threshold; and displaying the at least one formatted text element at the set font size.

\* \* \* \* \*